Patented June 1, 1954

2,679,969

UNITED STATES PATENT OFFICE 2,679,969

PACKAGE CONSTRUCTION

Frederic A. Richter, Chicago, Ill., assignor to Transparent Package Company, Chicago, Ill., a corporation of Illinois No Drawing. Application January 12, 1954, Serial No. 403,644

16 Claims. (Cl. 229—3.5)

The present invention relates to packaging materials, packages, and methods of manufacturing the same.

The use of various plastic film materials has been rapidly increasing in recent years, particularly for use as package forming media in producing packages for food products such as cheese, ground meats and the like as well as for machine parts, clothing and a host of other items. In patent applications Serial No. 390,040 and Serial No. 259,644 of which this is a continuation-in-part, there are disclosed the use of a variety of film materials for making packages such as envelopes, bags, tubes, and the like wherein such packages are formed of certain films in the form of a two-ply laminate.

The present invention is directed to the production of new packaging materials and new packages made therefrom of film materials in the form of multi-ply laminates, wherein the films used have sufficient cohesive affinity for each other so that their natural cling is sufficient to give the multi-ply laminate a unitary appearance and to permit improved types of packages to be made therefrom.

The production of certain kinds of adhesively laminated film combinations is not new; however, in contrast to such adhesively laminated composites of the prior art, the present packages are produced from certain plastic films in the form of composites, the films being laminated without the necessity of using any adhesives. Packages formed from laminates produced from such film combinations, may be printed or unprinted and may be either in clear, transparent form or may contain filters, dyes and additives of one kind or another.

The present packaging materials may be formed conveniently by winding the component films together in a roll. If desired the films which go to make up the laminate may be printed and the laminate made up so that printed images are on the inside; printing may also be applied so as to be on the outer surface of the laminate. However, it usually is preferred to have the printing between the layers, since the printing is then protected from rubbing, scuffing, and the effects of water, etc., and the natural sparkle and luster of the outer layer of the plastic film is not obscured. Additionally, the inks need not then be rapid drying nor need they be hard enough to prevent offset or blocking. Soft inks that cause blocking of the rolls are actually preferable when the printing is to be between the layers of the film, since they tend to improve the binding between adjacent layers.

When the printing is between the plies, the outer ply or plies should, of course, be transparent so that the design may be visible to the viewer.

The tension under which the component films are rolled onto the roll "one on top of the other," is not critical it being important only to make sure that there is sufficient tension so that a smooth and uniform "lay" is obtained.

The films contemplated for use in accordance with this invention are those plastic films which have such a degree of affinity for one another that they cohere when the films are manually pressed one to another with no more force than can be applied with the hands, or when wound together onto a roll under normal tension to such a degree that the resulting multi-ply laminate acquires the integral unitary character and general appearance of a single layer of film. In commercial practice the pressure applied by winding the component films in a roll under ordinary tension such as employed in winding plastic film onto rolls is sufficient to cause the hereinafter described film combinations to adhere satisfactorily.

This self-cohesive character is apparently the result of some kind of surface attraction forces, present in certain films, and does not appear to be caused by the presence or absence, or by differences in amount of, plasticizers which are sometimes used as components of the plastic of which the film is formed, but is greatly influenced by the smoothness of the contacting surfaces. Increasing smoothness of the film surface has a beneficial effect in increasing the adhesiveness of that surface of the film, and generally speaking, it is preferred where the films have one relatively smooth surface and a relatively rough surface that laminates formed therefrom be produced so that the smoother surfaces of the films are in contact with each other.

The films that I have discovered are particularly suitable for use in accordance with the present invention appear to fall into two general groups indicated below as Group A and Group B; the Group A combinations have a higher degree of cohesive affinity; however, for certain purposes it will be understood that the Group B film pairs may of course be used.

Group A

| | |
|---|---|
| Saran-saran | Pliofilm-Pliofilm |
| Saran-Pliofilm | Pliofilm-cellophane |
| Saran-vinyl | Pliofilm-vinyl |
| Saran-polystyrene | Pliofilm-polystyrene |
| Cellophane-vinyl | Vinyl-polystyrene |

Group B

Saran-cellophane
Saran-Mylar
Saran-cellulose acetate
Pliofilm-Mylar
Cellophane-Mylar
Mylar-Mylar
Mylar-vinyl
Vinyl-cellulose acetate With reference to the film pairs listed above it is of course understood that these are illustrative only and that multiple ply laminates having any number of different films can be produced by properly combining those films which have cohesive affinity for each other sufficient for the purposes of the present invention. Purely by way of illustration and not by way of limitation there is listed below some examples of other useful combinations of film as follows:

Cellophane-Saran-Pliofilm
Saran-cellophane-Pliofilm
Cellophane-vinyl-Saran
Vinyl-cellophane-Saran
Vinyl-Saran-cellophane
Vinyl-Saran-vinyl
Saran-vinyl-Saran
Saran-Mylar-Saran
Mylar-Saran-Mylar
Polystyrene-Saran-polystyrene
Saran-Polystyrene-Saran
Pliofilm-Polystyrene-Pliofilm
Pliofilm-Saran-polystyrene
Pliofilm-Saran-polystyrene-Pliofilm
Pliofilm-Saran-polystyrene-vinyl-Pliofilm
Pliofilm - Saran - polystyrene - vinyl - Mylar - Pliofilm Included in the term "cellophane" as used above and hereinafter is Saran-coated cellophane. It may be pointed out that a number of films and film combinations just do not have the necessary inherent cohesive characteristics required to produce packages formed of laminates of such films. Among the film pairs which fall in this category are for example, Mylar-polystyrene, Saran-polyethylene, Pliofilm-polyethylene, Pliofilm-cellulose acetate, polyethylene-polyethylene, to mention a few. With respect to plastic films other than those specifically mentioned herein, there appears to be no way of predicting before testing whether such a film will or will not have the requisite surface attraction characteristics demanded by the present invention.

I have found that cellophane with increased surface adhesiveness may be produced by omitting the customary surface treatment given to commercially-available cellophane. These untreated cellophane films give substantially better results when used in the multi-ply packages described herein.

In the listing of the films above, it is to be pointed out that the specific films tested and their commercial identification and other characteristics are as follows:

| Trade Name and Supplier | Material | Type | Thickness, inches |
| --- | --- | --- | --- |
| Saran (Dow) | Polyvinylidene Chloride. | B-517 | .001 |
| Pliofilm (Goodyear) | Rubber Hydrochloride | HM-120 | .0012 |
| Polyethylene (Harwid-Olin Ind.). | Polyethylene | | .002 |
| Cellophane (DuPont) | Regenerated Cellulose, Coated. | MST-54 | .001 |
| Mylar (DuPont) | Polyethylene Terephthalate. | A | .001 |
| Vinyl (General Tire & Rubber Co.). | Vinyl Chloride-Acetate Copolymer. | XV-174 | .002 |
| Polystyrene (Dow) | Polystyrene | Q-641 | .001 |
| Acetate (Celanese) | Cellulose Acetate | | .003 |

The films to be used in accordance with this invention, of which the above are representative, are not sticky in the sense that they adhere to each other or to other films as Scotch tape or similar pressure sensitive coated tapes; that is to say the films used herein are not sensibly sticky, and it is neither necessary nor desirable that they be loaded with plasticizers to give them stickiness for the purposes of this invention. The plasticizer content of these films is conventionally only a few per cent and need not be over about ten or twenty per cent; and as a matter of fact, plasticizers can be completely eliminated from the film were it not for the softness, flexibility and hand which they impart thereto. At any rate, the self-cohesiveness of the films used in accordance with this invention, is not obtained by employing any more plasticizer than normally required to achieve the desired softness and flexibility.

As an example of a particular film laminate that we have found useful, reference is made to the following detailed example:

EXAMPLE 1

A two-ply laminate of Saran film 0.00075" in thickness, and a type HM Pliofilm 0.0006" in thickness, showed good clarity, excellent gloss, and when made into a bag filled with beans and tumbled until the bag broke, showed four times the durability of a conventional two-ply Saran film bag, each ply being 0.00075" thick. The bag was heat sealable for closure on conventional hot bar sealer whereas Saran film cannot be satisfactorily sealed except by the use of complex and expensive electronic sealing devices. In addition, the package retains the unique moisture and gas proof qualities of Saran film packages, which would not be obtained from two plies of Pliofilm.

EXAMPLE 2

A three ply laminate of Pliofilm-Saran-Pliofilm likewise combined the high durability of Pliofilm with the excellent moisture and gas proofness of Saran film. Additionally, both exterior surfaces of the combination are readily heat sealable to each other, so that lap-over seals can be made with hot bar sealers.

The laminate of the present invention can be used as described in copending application, Serial No. 390,040, filed November 3, 1953, to produce envelopes, bags, tubes and so on.

In summary, I have discovered that commercially acceptable multi-ply packages in which the plies cling tightly to each other, can be made from certain plastic films without the use of adhesives. That this is completely unexpected is shown by the fact that multi-layered packages now on the market, in which the film layers are in intimate contact with each other, achieve this contact by the use of adhesives which of themselves are expensive and which greatly complicate the manufacturing process and increase the waste. Moreover, I have discovered that packages made from my film combinations exhibit unexpected properties that are substantially different from the sum of the properties of the individual films.

And while I have described the presently preferred embodiment of the present invention, it will be apparent that certain changes and rearrangements and variations may be made therein without departing from the scope of the present invention as defined by the appended claims. It is also to be understood that the following claims are intended to cover all of the generic and specific features of the invention hereindescribed, and all statements of the scope of the invention, as a matter of language, might be set to fall therebetween.

I claim:

1. A package formed of a laminate comprising a plurality of plies of thin flexible films, each of said plies adhering to an adjoining ply as a result of the inherent attractive forces in the face-to-face surfaces of said adjoining plies, at least two of said plies being composed of different film material.

2. The package of claim 1 wherein the laminate is composed of two plies of rubber hydrochloride film having a ply of polyvinylidene chloride film positioned therebetween.

3. The package of claim 1 wherein at least the outer ply is transparent.

4. The package of claim 1 wherein the laminate comprises at least three plies.

5. The package of claim 4 having printing on at least one of the interior surfaces of the laminate.

6. A package formed of a laminate comprising a plurality of plies of thin, flexible films, each of said plies adhering to and adjoining ply as a result of the inherent attractive forces in the face-to-face surfaces of said adjoining plies, all of said films being composed of the same film material and at least one of said plies being printed.

7. A package formed of two-plies of thin flexible cohering film, at least the outer one of which is transparent, said two-ply film being selected from the group of film pairs consisting of, polyvinylidene chloride and rubber hydrochloride, polyvinylidene chloride and vinyl chloride-acetate copolymer, polyvinylidene chloride and polystyrene, rubber hydrochloride and cellophane, rubber hydrochloride and vinyl chloride-acetate copolymer, rubber hydrochloride and polystyrene, cellophane and vinyl chloride-acetate copolymer, vinyl chloride-acetate copolymer and polystyrene; the face to face surfaces of said plies being in intimate contact with each other, one of said plies having printing on that surface which is in intimate contact with a surface of the other ply.

8. A package formed of two-plies of thin flexible cohering film at least the outer one of which is transparent, said plies being selected from the group of film pairs consisting of, polyvinylidene chloride film and cellophane, polyvinylidene chloride film and polyethylene terephthalate, polyvinylidene chloride and cellulose acetate, rubber hydrochloride and polyethylene terephthalate, cellophane and polyethylene terephthalate, polyethylene terephthalate and vinyl chloride-acetate copolymer, vinyl chloride-acetate copolymer and cellulose acetate, the face to face surfaces of said ply being in intimate contact with each other, one of said plies having printing on that surface which is in intimate contact with a surface of the other ply.

9. A package formed of two-plies of cohering transparent rubber hydrochloride film, each of said plies adhering to an adjoining ply as a result of the inherent attractive forces in the face-to-face surfaces of said plies, the face-to-face surfaces of said plies being in intimate contact with each other, one of said plies having printing on that surface which is in intimate contact with a surface of the other ply.

10. The article of claim 9 wherein the package is in the form of a bag.

11. The article of claim 9 wherein the package is in the form of a tube.

12. A flexible tubular container formed of multiple-layered cohering transparent rubber hydrochloride film with reversed images printed on the inner surface of an outer layer of said multiple layered film each of said plies adhering to an adjoining ply as a result of the inherent attractive forces in the face-to-face surfaces of said adjoining ply, the face-to-face surfaces of said layer being in intimate contact with each other.

13. A package formed of a two-ply film, one of said plies being polyvinylidene chloride and the other ply being rubber hydrochloride each of said plies adhering to an adjoining ply as a result of the inherent attractive forces in the face-to-face surfaces of said adjoining ply, the face-to-face surfaces of said plies being in intimate contact with each other, one of said plies having printing on that surface which is in intimate contact with a surface of the other ply.

14. The article of claim 13 wherein the package is in the form of a bag.

15. The article of claim 13 wherein the package is in the form of a tube.

16. A package formed of two plies of cohering transparent polyethylene terephthalate, each of said plies adhering to an adjoining ply as a result of the inherent attractive forces in the face-to-face surfaces of said adjoining plies, one of said plies having printing on that surface which is in intimate contact with a surface of the other ply.

References Cited in the file of this patent

UNITED STATES PATENTS

| Number | Name | Date |
| --- | --- | --- |
| 2,275,814 | Abrams et al. | Mar. 10, 1942 |
| 2,422,725 | Gilfillan | June 24, 1947 |
| 2,536,773 | Saidel | Jan. 2, 1951 |
| 2,622,991 | Sturm | Dec. 23, 1952 |

FOREIGN PATENTS

| Number | Country | Date |
| --- | --- | --- |
| 514,560 | Great Britain | Nov. 13, 1939 |